(12) United States Patent
Cecchin

(10) Patent No.: US 12,358,248 B2
(45) Date of Patent: Jul. 15, 2025

(54) MULTI-LAYERED ELEMENT FOR MANUFACTURING SPECTACLE FRAMES, METHOD FOR MANUFACTURING SUCH MULTI-LAYERED ELEMENT AND SPECTACLE FRAME COMPRISING ONE OR MORE MULTI-LAYERED ELEMENTS

(71) Applicant: H2C S.R.L., Rome (IT)

(72) Inventor: Orfeo Cecchin, Bassano del Grappa (IT)

(73) Assignee: H2C S.R.L., Rome (IT)

( * ) Notice: Subject to any disclaimer, the term of this patent is extended or adjusted under 35 U.S.C. 154(b) by 696 days.

(21) Appl. No.: 17/431,394

(22) PCT Filed: Feb. 14, 2020

(86) PCT No.: PCT/IB2020/051245
§ 371 (c)(1),
(2) Date: Aug. 16, 2021

(87) PCT Pub. No.: WO2020/170095
PCT Pub. Date: Aug. 27, 2020

(65) Prior Publication Data
US 2022/0137429 A1    May 5, 2022

(30) Foreign Application Priority Data
Feb. 18, 2019 (IT) .......................... 102019000002349

(51) Int. Cl.
*B29D 12/02*    (2006.01)
*B32B 7/12*    (2006.01)
(Continued)

(52) U.S. Cl.
CPC ................ *B29D 12/02* (2013.01); *B32B 7/12* (2013.01); *B32B 15/08* (2013.01); *B32B 37/12* (2013.01);
(Continued)

(58) Field of Classification Search
None
See application file for complete search history.

(56) References Cited

U.S. PATENT DOCUMENTS 4,370,461 A * 1/1983 Burton .................. C08G 18/58
528/45
2012/0073975 A1    3/2012 Ganti
2013/0069274 A1    3/2013 Zhang et al.

FOREIGN PATENT DOCUMENTS

DE    202007010696 U1    9/2007
DE    102013213579 A1    9/2014
(Continued)

OTHER PUBLICATIONS

Fourche, An Overview of the Basic Aspects of Polymer Adhesion. Part II: Application to Surface Treatments, Polymer Engineering and Science, vol. 35, No. 12. (Year: 1995).*

(Continued)

*Primary Examiner* — Ramsey Zacharia
(74) *Attorney, Agent, or Firm* — Fredrikson & Byron, P.A.

(57) ABSTRACT

A multi-layered element for manufacturing spectacle frames including at least one layer of polymeric material. The multi-layered element is a front piece or a side piece of a spectacle frame. Moreover, the multi-layered element includes at least one layer of metallic material joined to the layer of polymeric material by means of a layer of adhesive material. Also provided is a spectacle frame including one or more multi-layered elements and a method for manufacturing a multi-layered element.

8 Claims, 7 Drawing Sheets

(51) Int. Cl.
    *B32B 15/08*     (2006.01)
    *B32B 37/12*     (2006.01)
    *B32B 38/00*     (2006.01)
    *G02C 1/06*     (2006.01)
    *G02C 5/00*     (2006.01)

(52) U.S. Cl.
    CPC ...... *B32B 38/0004* (2013.01); *B32B 38/0012* (2013.01); *G02C 5/008* (2013.01); *B32B 2038/002* (2013.01); *B32B 2250/02* (2013.01); *G02C 1/06* (2013.01); *G02C 2200/14* (2013.01)

(56) References Cited

FOREIGN PATENT DOCUMENTS

| | | | | |
|---|---|---|---|---|
| DE | 202015103674 U1 | 8/2015 | | |
| GB | 1531907 A | * 11/1978 | ............. | B29D 12/02 |
| KR | 101281334 B1 | 7/2013 | | |
| WO | 2010078687 A1 | 7/2010 | | |
| WO | 2011101735 A1 | 8/2011 | | |
| WO | 2015140229 A1 | 9/2015 | | |
| WO | 2017145043 A1 | 8/2017 | | |

OTHER PUBLICATIONS

PCT International Search Report and Written Opinion dated May 29, 2020 for Intl. App. No. PCT/IB2020/051245, from which the instant application is based, 11 pgs.

* cited by examiner

MULTI-LAYERED ELEMENT FOR MANUFACTURING SPECTACLE FRAMES, METHOD FOR MANUFACTURING SUCH MULTI-LAYERED ELEMENT AND SPECTACLE FRAME COMPRISING ONE OR MORE MULTI-LAYERED ELEMENTS

RELATED APPLICATIONS

This application is a 35 U.S.C. 371 national stage filing from International Application No. PCT/IB2020/051245, filed Feb. 14, 2020, which claims priority to Italian Application No. 102019000002349, filed Feb. 18, 2019, the teachings of which are incorporated herein by reference.

FIELD OF THE INVENTION

The present invention relates to the technical sector for the production of spectacle frames.

In particular, the present invention relates to a multi-layered element for the manufacture of spectacle frames and a spectacle frame obtained from one or more multi-layered elements of the type described above.

Moreover, the present invention relates to a method for manufacturing the multi-layered element of the type described above.

BACKGROUND

In the field for the production of spectacles it is known to use polymeric materials to manufacture the components of the frames, such as the side pieces and the front pieces.

The polymeric material used for manufacture of the frame may be chosen, for example, from the group comprising cellulose acetate, polyamides, polypropylene, TPU and epoxy resins.

Alternatively, the frame may also be made of materials different from polymeric materials such as metals (for example titanium), wood, horn or carbon fibre.

With reference to frames made of polymeric material, for example cellulose acetate, the side pieces and front pieces of the frames are obtained from sheets of cellulose acetate which are glued and pressed together to produce semi-finished products and then milled to obtain the profile of the side pieces or the front piece of the frame.

In the case where polyamides or epoxy resins are used, the side pieces and front pieces of the frames are obtained by means of cast-moulding or injection-moulding of the material in a suitably shaped mould.

The frame may also comprise one or more inserts, for example made of metallic material, which are designed to reinforce its structure. These inserts may be visible from the outside and occupy a small area of the frame.

For example, the inserts may be mounted on the side pieces or the front pieces by means of milling of the cellulose acetate semi-finished products or hot-mounted.

Alternatively, in the case of components obtained by means of casting or injection of polymeric material inside a mould, these inserts may be loaded inside the mould in a predetermined position before injection of the material, so as to be then incorporated in the structure of the side pieces or the front piece.

A first drawback of the frames made of cellulose acetate consists in the fact that this material, even if it is considered to be of a higher quality compared to the materials used in moulding processes, has a smaller resistance to shearing and bending stresses.

Moreover, the increasingly pressing demands of an aesthetic nature, aimed at a reduction in the overall dimensions and weight of the frame, have resulted in a reduction in the resistant cross-sections of the side pieces and of the front piece, further lowering the resistance to shearing and bending stresses.

Moreover, a drawback of the frames made of polymeric material by means of moulding consists in the fact that only limited aesthetic combinations may be obtained.

Furthermore, these materials are prone to scratching and wear and are less resistant to high temperatures. If, for example, a cellulose acetate frame is left in the sunlight on the instrument panel of a motor vehicle it may become permanently deformed.

In order to overcome at least partially the aforementioned drawbacks, it is possible to manufacture the frame using a stronger metallic material. However, this solution would result in a significant increase in the production costs.

Another drawback of the frames made of polymeric material, be they made of cellulose acetate or nylon, is that it is not possible to perform the machining operations which are usually carried out on metals, such as mirror-polishing, passivation and anodization.

Another drawback of the frames made of polymeric material consists in the fact that these materials may have a reduced resistance to UV rays or to acids or a reduced flexibility.

BRIEF SUMMARIES OF OBJECTS OF THE INVENTION

A particular task of the present invention is to provide a multi-layered element for manufacturing spectacle frames, a method for manufacturing the multi-layered element and a spectacle frame, which are able to overcome the aforementioned drawbacks.

Another task of the present invention is to provide a method which is able to produce spectacle frames with an attractive appearance and an improved resistance to shearing and to bending stresses.

A further task of the present invention is to provide a method for manufacturing a spectacle frame which allows materials of a different nature to be stably joined together.

Another task of the present invention is to provide a multi-layered element for manufacturing spectacle frames, which in particular is resistant to high temperatures.

Another task of the present invention is to provide a multi-layered element for manufacturing spectacle frames, which is in particular resistant to diluted acids, alkalis, solvents, fats, oils, moisture, salt fog and atmospheric agents.

A further task of the present invention is to provide a spectacle frame which has a greater resistance to indirect exposure to UV rays.

A further task of the present invention is to provide a spectacle frame which has a high wear-resistance and at the same time low production costs.

Another task of the present invention is to provide a method for manufacturing a multi-layered element for manufacturing spectacle frames which may be easily implemented on an industrial scale.

The object and the main tasks described above are achieved with a spectacle frame and with a method for manufacturing the spectacle frame, according to the claims herein.

BRIEF DESCRIPTIONS OF THE DRAWINGS

In order to illustrate more clearly the innovative principles of the present invention and its advantages compared to the prior art, an example of embodiment will be described below with the aid of the accompanying drawings. In the drawings:

FIG. 3b shows an enlarged view of the detail indicated by IIIB in FIG. 3a;

DETAILED DESCRIPTION OF EMBODIMENTS OF THE INVENTION

Figure 1:
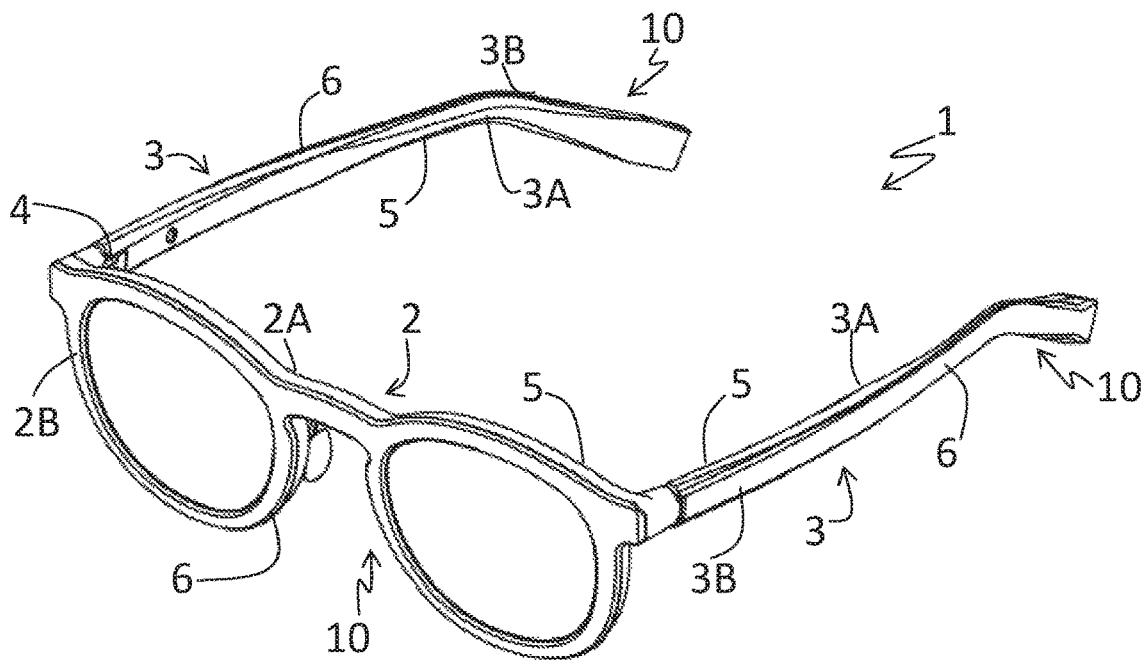
FIG. 1 shows a perspective view of a spectacle frame according to the present invention.

With reference to the attached figures, in particular FIGS. 1-4, the present invention relates to a spectacle frame, denoted overall by the reference number 1, and to a multi-layered element for manufacturing spectacle frames, denoted by the reference number 10.

In a manner known per se, the frame 1 comprises a front piece 2 and a pair of side pieces 3 joined to the ends of the front piece 2 by means of respective hinges 4.

The forms and the dimensions of the front piece 2 and side pieces 3 may be chosen from among those which are commonly known in the sector and therefore will not be discussed below.

In accordance with the present invention, the front piece 2 and/or the side pieces 3 of the frame 1 are formed by multi-layered elements 10 according to the present invention.

In FIGS. 1-4, both the front piece 2 and the side pieces 3 are formed by respective multi-layered elements 10. However, it is also possible to envisage frames 1 which have only the front piece 2, or only the side pieces 3, formed by the multi-layered elements 10 according to the present invention, without thereby departing from the scope of protection of the present invention.

Advantageously, the multi-layered elements 10 of the side pieces 3 and/or of the front piece 2 of the frame 1 may be made from a multi-layered semi-finished product 110, which will be described below and in FIGS. 5-8.

Figure 3A:
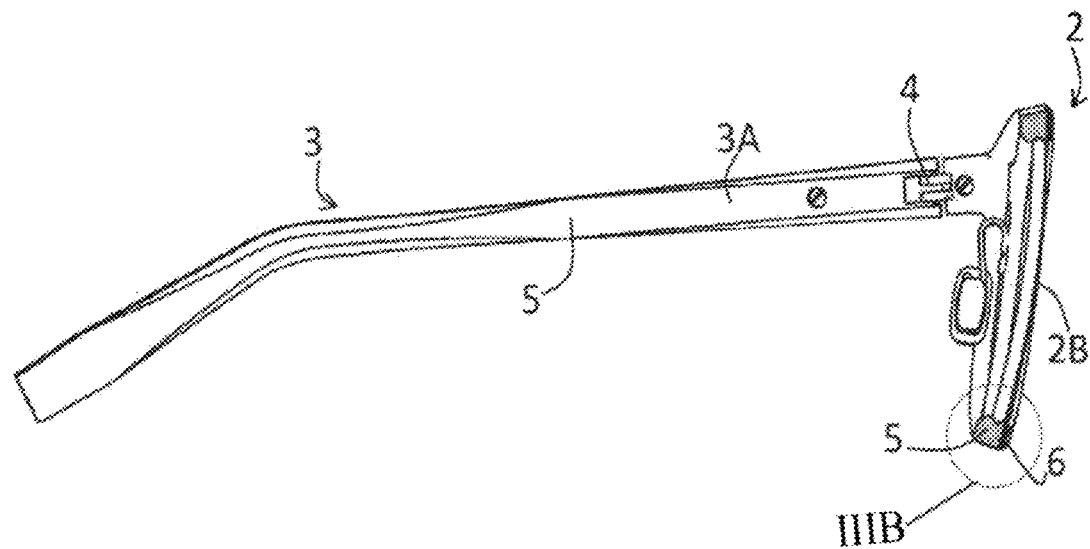
FIG. 3a shows a view cross-sectioned view along the plane indicated by IIIA-IIIA in FIG. 2.
Figure 3B:
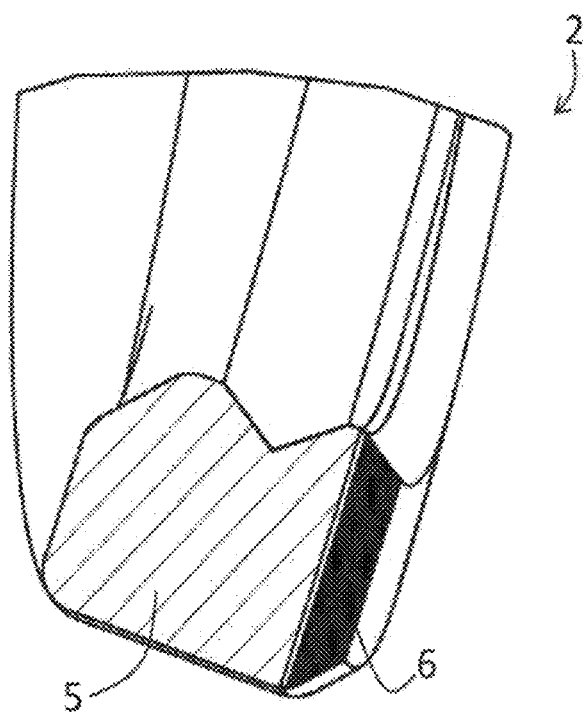
Figure 4:
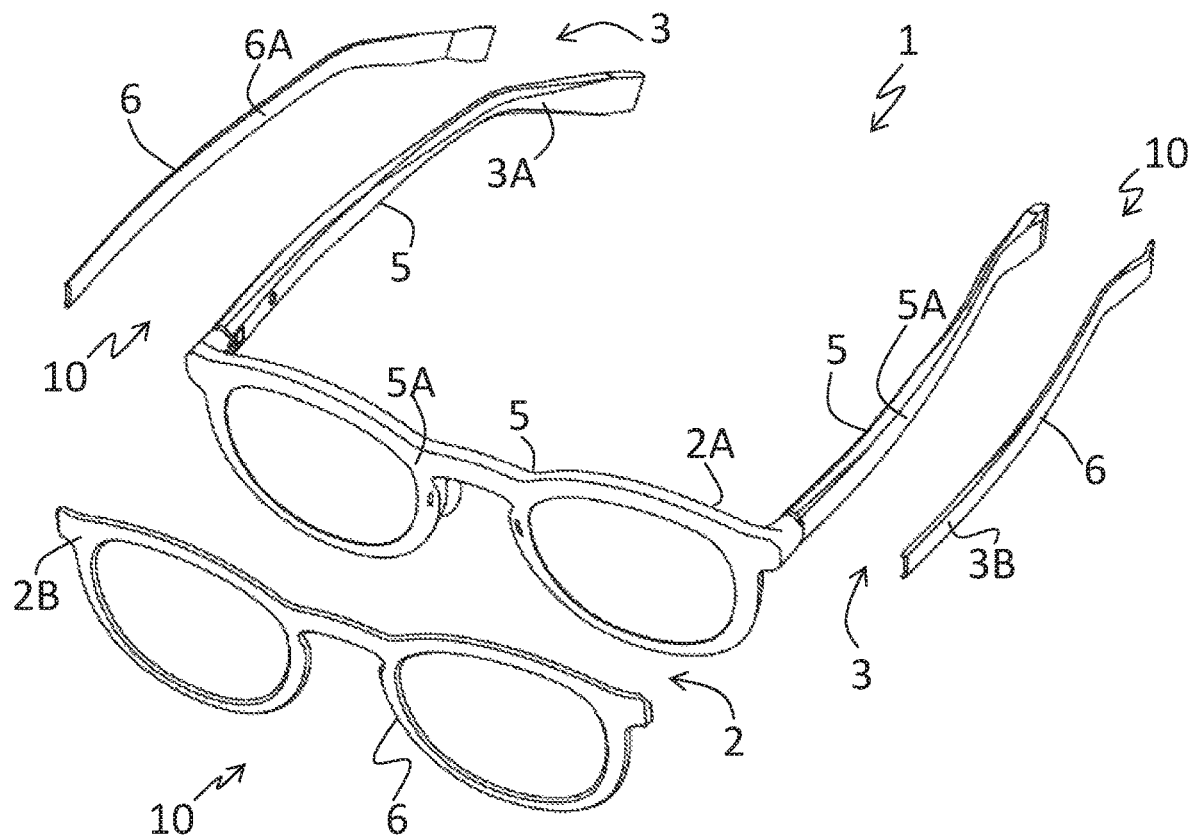
FIG. 4 shows a partially exploded perspective view of the frame according to FIG. 1.
Figure 5:
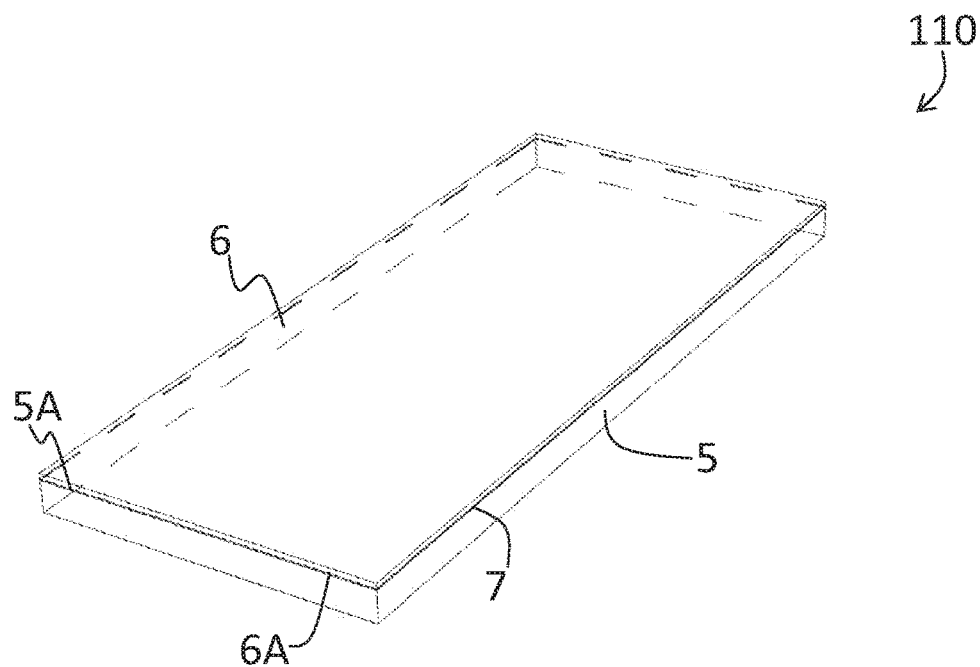
FIG. 5 shows a perspective view of a multi-layered semi-finished product for manufacturing the multi-layered element according to the present invention.
Figure 6:
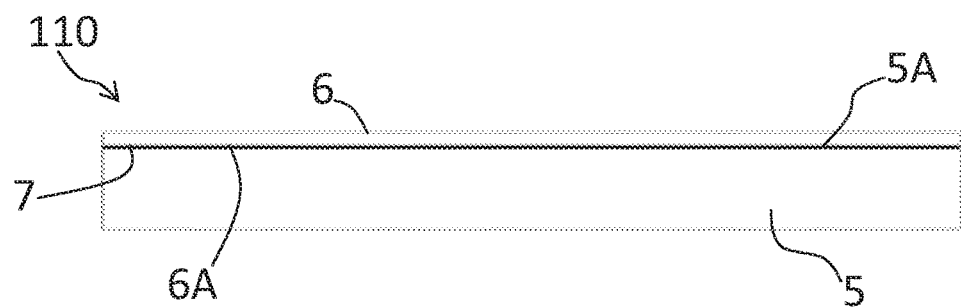
FIG. 6 shows a front view of the semi-finished product according to FIG. 5.

In accordance with the present invention, the multi-layered element 10 comprises at least one layer 5 of polymeric material and at least one layer 6 of metallic material (see FIGS. 3a, 3b and 4).

Advantageously, the polymeric material 5 may be chosen from the group comprising cellulose acetate, while the metallic material 6 may be chosen from the group comprising aluminium, stainless steel, brass, titanium, bronze and copper.

The layers of polymeric material 5 and metallic material 6 are joined together by means of a layer of adhesive material 7, which can be seen for example in FIGS. 5, 6, 9c and 9d.

In particular, the layer of adhesive material 7 is placed between a joining surface 5A of the layer of polymeric material 5 and a joining surface 6A of the layer of metallic material 6.

Preferably, the layer of metallic material 6 is provided on the outer visible surfaces 2B, 3B of the front piece 2 and the side pieces 3. The layer of polymeric material 5 may be designed to define the inner visible surfaces 2A, 3A of the front piece 2 and/or the side pieces 3.

The inner surfaces 2A, 3A are those which are directed towards the user when the frame 1 is worn, while the outer surfaces 2B, 3B are those directed in the opposite direction, as clearly shown in FIG. 1.

As can be seen in FIG. 1, the multi-layered element 10 of the front piece 2 may have a layer of metallic material 6 having dimensions and a form corresponding to those of the front surface of the underlying layer of polymeric material 5, leaving visible only the end portions of front piece 2 in which the hinges 4 are provided.

Similarly, the multi-layered elements 10 of the side pieces 3 may have a layer of metallic material 6 having a form and dimensions corresponding to those of the underlying layer of polymeric material 5.

Alternatively, the layer of metallic material 6 may leave visible, at least partially, a portion of the underlying layer of polymeric material 5, both in the front piece 2 and in the side pieces 3.

Advantageously, as shown in the embodiment of FIGS. 1-4, the layer of metallic material 6 may have a smaller thickness than the layer of polymeric material 5.

Figure 2:
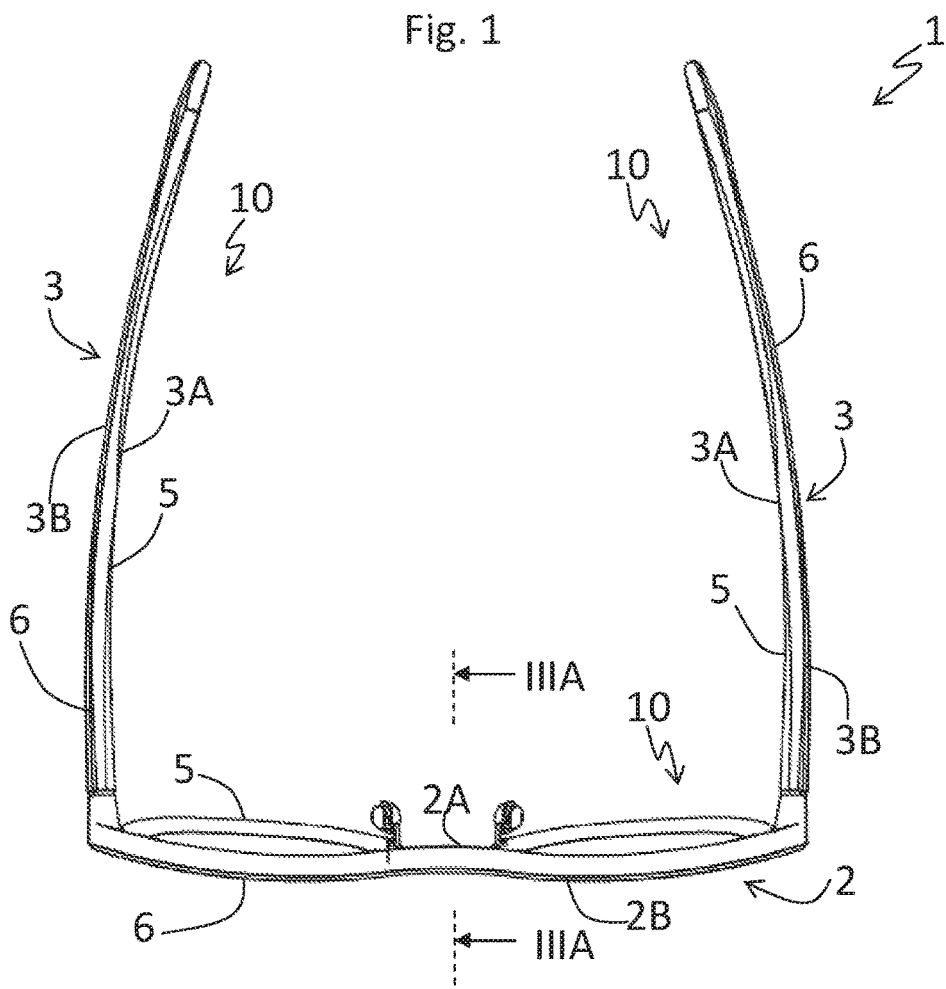
FIG. 2 shows a top plan view of the spectacle frame according to FIG. 1.

For this reason, the perimetral edges of the polymeric layer 5, both of the front piece 2 and of the side pieces 3, are visible with respect to the metallic layer 6 when viewing the frame from above or below, as shown in FIG. 2.

As already mentioned, the layers of polymeric material 5 and metallic material 6 are joined together by a layer of adhesive material 7 provided on the respective facing joining surfaces 5A, 6A.

Advantageously, the joining surfaces 5A, 6A may have surface roughness values which differ from each other. In particular, the roughness value of the surface 5A of the layer of polymeric material 5 may be comprised between 1 and 3.4 μm, while the roughness value of the surface 6A of the metallic material 6 may be comprised between 0.8 and 3.2 μm.

In a preferred, but non-limiting embodiment of the invention the roughness value of the surface 5A of the polymeric material 5 is equal to about 2.2-2.4 μm, while the roughness value of the surface 6A of the metallic material is equal to about 2.0-2.2 μm.

These roughness values allow the layer of adhesive material 7 to adhere stably to both the surfaces 5A, 6A at the time when they are joined together.

By way of example, the adhesive material 7 may be of the acrylic, modified acrylic or epoxy type or an acrylic-epoxy mixture and comprises a catalyst designed to promote the polymerization thereof. This adhesive material has a good resistance both to high temperatures and to low temperatures (−40° C. to +149° C.) following polymerization and a greater flexibility compared to adhesives of the epoxy type.

The greater flexibility is particularly advantageous during the subsequent operations for performing bending and assembly of the multi-layered element 10.

The adhesive material 7 of the type described above is particularly resistant to diluted acids, alkalis, solvents, fats, oils, moisture, salt fog, atmospheric agents and UV rays.

Moreover, the layer of adhesive material 7 may have a predetermined variable thickness.

Below a method for manufacturing the multi-layered element 10 of the type disclosed above is described, with reference to FIGS. 9a-9g which illustrate some steps of the method.

Preferably, the method comprises a step a) of cutting a sheet of polymeric material, not shown in the figures, for obtaining the layer of polymeric material 5 with a predefined profile and a step b) of cutting a sheet of metallic material, not shown in the figures, for obtaining the layer of metallic material 6 with a predefined profile. The aforementioned cutting steps shown in the accompanying figures are well-known to the person skilled in the art.

The sheet of polymeric starting material may be obtained by means of superimposition and joining together of a plurality of substrates of polymeric material and preferably will be cut by means of milling so as to adjust it to dimensions and a shape suitable for forming a front piece or a side piece.

The sheet of metallic starting material may be cut by means of laser, plasma or water or using other cutting methods depending on the characteristics and the thickness of the layer of metal to be obtained.

Figure 7:
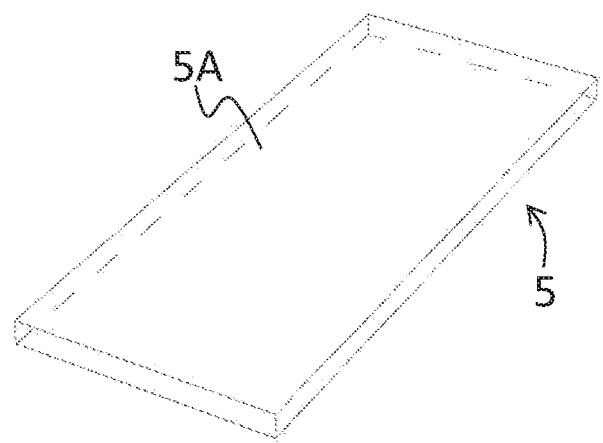
FIGS. 7 and 8 show perspective views of two components of the multi-layered semi-finished product according to FIG. 5.
Figure 8:
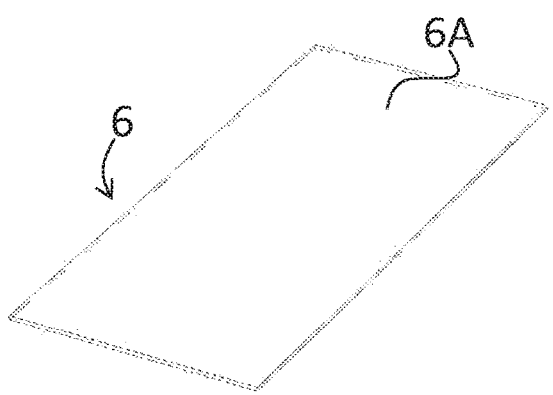

The profiles obtained following the cutting steps may correspond to those shown in FIGS. 7 and 8 and may have, for example, a rectangular shape.

However, different forms of the layers 5, 6 may also be envisaged without thereby departing from the scope of protection of the present invention.

Figure 9A:
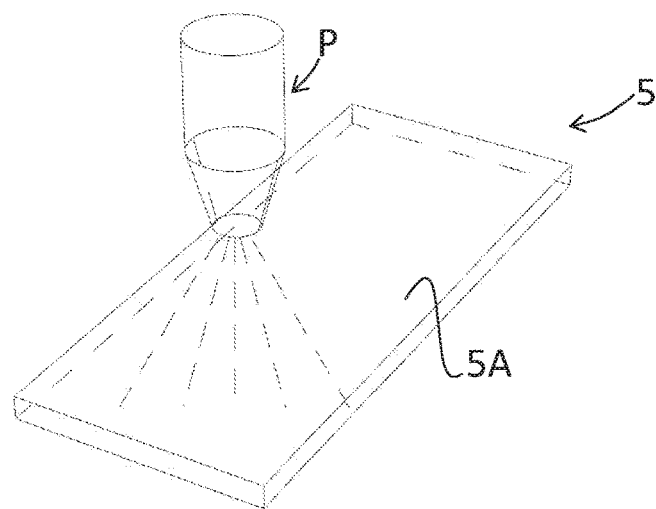
FIG. 9a-9g show schematic views of the various steps of a method for manufacturing the multi-layered element according to the present invention.
Figure 9B:
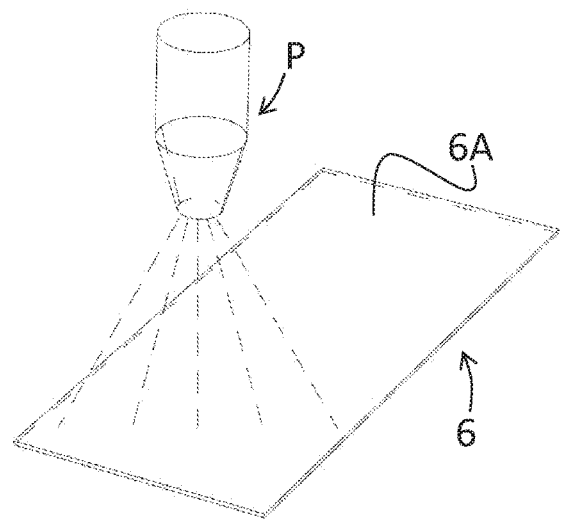
Figure 9C:
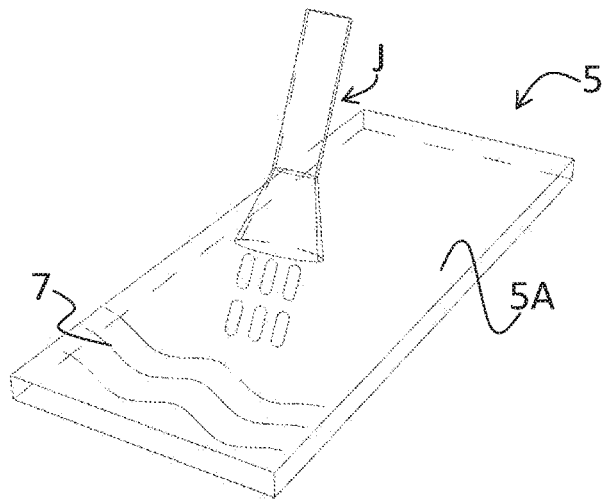

Then a step c) is provided for applying a layer of adhesive material 7 onto a surface 6A of the layer of polymeric material 5 and/or onto a surface 6A of the layer of metallic material 6, as shown in FIG. 9c with reference to the layer of polymeric material 5.

Preferably, the adhesive material 7 is applied onto the surface 5A of the layer of polymeric material 5 by means of an applicator device J of the type known per se. In particular, a predetermined quantity of adhesive material 7 is applied, for example by means of an automatic dispenser, such as to cover the entire surface 5A of the layer of polymeric material 5.

Advantageously, before the step c), a step g) may be provided for sandblasting the surfaces 5A, 6A of the layer of polymeric material 5 and the layer of metallic material 6 which are designed to come into contact with the layer of adhesive material 7, as shown in FIGS. 9a and 9b.

By means of the sandblasting step it is possible to obtain a predetermined roughness value of the two surfaces 5A, 6A, for example equal the aforementioned values.

For example, the sandblasting step may be performed using a shot-peening machine (or sand blaster) P, shown in schematic form in FIGS. 9a and 9b. The shot-peening machine may be set to a pressure of 8 bar and loaded with corundum sand having a grain size value of 100.

Moreover, following the step g), a step h) may be provided for cleaning the surfaces 5A, 6A of the layer of polymeric material 5 and of the layer of metallic material 6 which have previously undergone sandblasting, not shown in the figures.

By way of example, the step h) may be performed by rubbing the surface 5A of the layer of polymeric material 5 using a cloth soaked with isopropyl alcohol and the surface 6A of the layer of metallic material 6 using a cloth soaked with acetone.

This operation is necessary in order to remove any residues, or traces of oil, lubricants and grease which could negatively affect the adhesion between the layers 5, 6.

The method further comprises a step d) of positioning the layer of metallic material 6 on the surface 5A of the polymeric material 5 on which the layer of adhesive material 7 has been previously applied or, alternatively, of positioning the layer of polymeric material 5 on the surface 6A of the metallic material 6, on which the layer of adhesive material 7 has been previously applied.

Figure 9D:
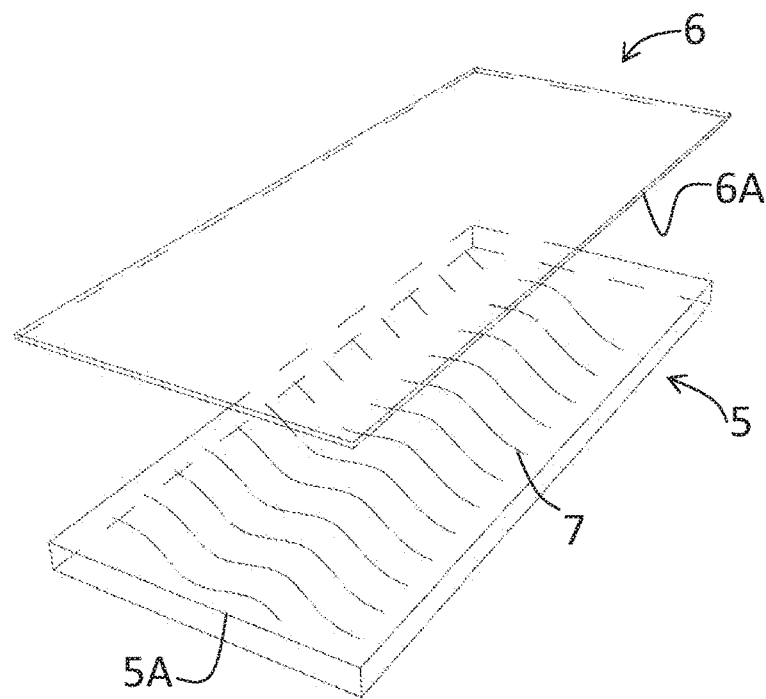

The positioning step d) allows an intermediate processed product 120 to be obtained and is schematically shown in FIG. 9d.

Figure 9E:
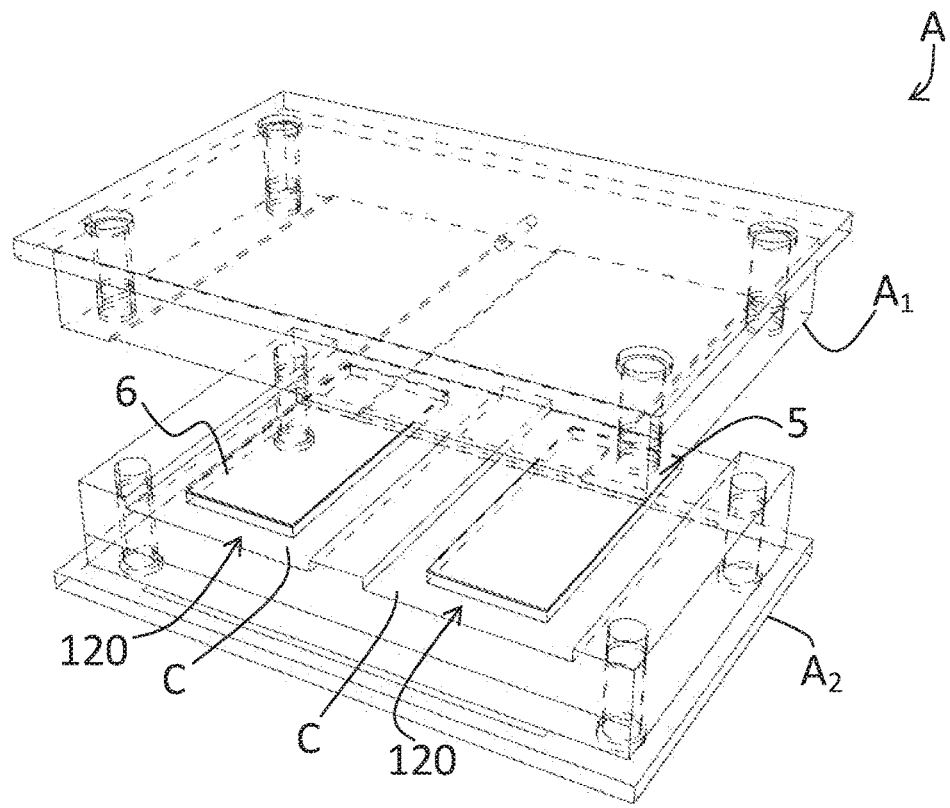
Figure 9F:
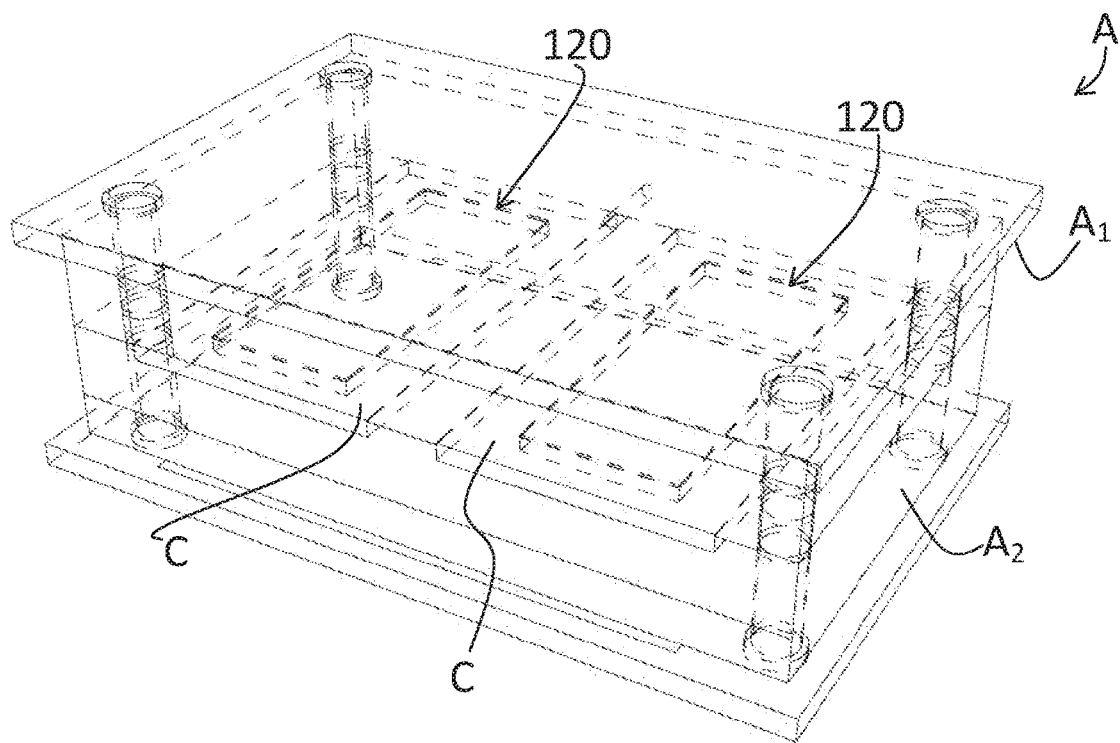
Figure 9G:
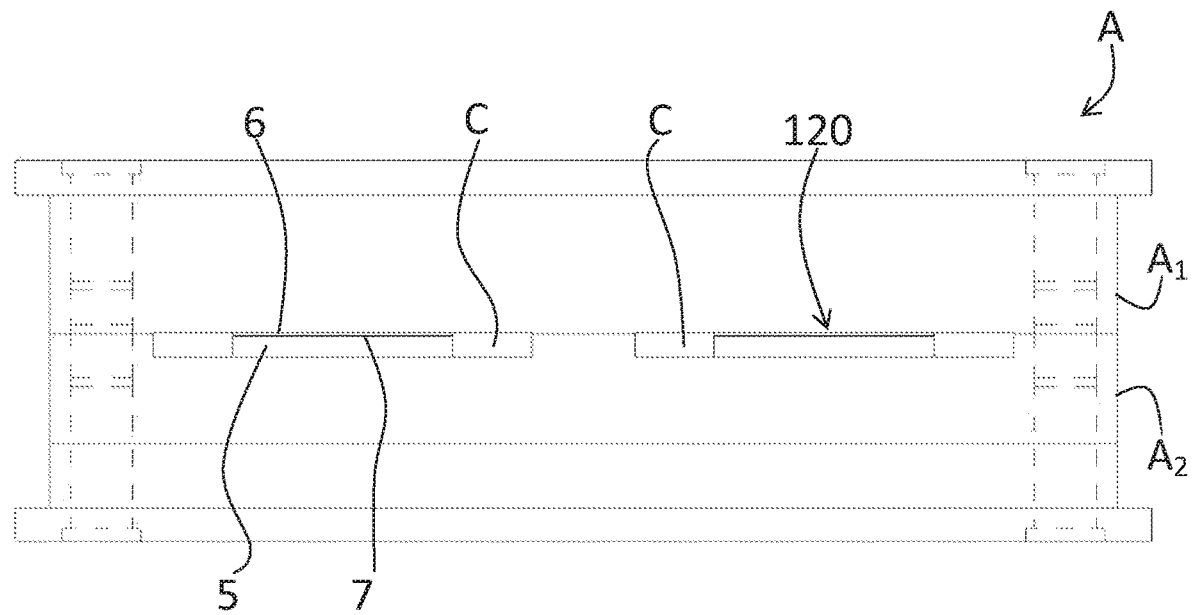

Finally, a step e) is provided for pressing and joining together the layers of polymeric material 5 and metallic material 6 with the arrangement in between of the layer of adhesive material 7, namely the intermediate processed product 120, as shown in FIGS. 9e, 9f and 9g, for forming the multi-layered semi-finished product 110. The polymerization of the adhesive material 7 containing the catalyst is preferably performed during the pressing step.

Preferably, before proceeding with the pressing step, the liquid used for the cleaning step is allowed to evaporate from the surfaces 5A, 6A of the layer of polymeric material 5 and layer of metallic material 6.

Advantageously, the step e) may be performed by positioning the intermediate processed product 120 inside a gluing machine A comprising an upper portion A1 and a lower portion A2, as illustrated in FIGS. 9e to 9g.

The upper portion A1 of the apparatus A is fixed to the upper surface of a press, while the lower portion A2 of the apparatus A is fixed to the lower surface of the press and comprises one or more cavities C for housing the intermediate processed products 120. The press is not shown in the figures and may be of the type known per se.

The apparatus A remains preferably closed for a duration of about 10 minutes during which polymerization of the adhesive material 7 occurs and may be heated and kept at a temperature of about 55° C.

In addition to promoting joining together of the layer of polymeric material 5 and layer of metallic material 6, pressing favours the expulsion of the air and the excess adhesive material between the layers.

Moreover, when the multi-layered semi-finished product 110 is extracted from the apparatus A following pressing, a step of removing the excess adhesive along the edge of the product may be provided. The method also comprises a step f) of machining the semi-finished product 110 to form the front piece 1 and/or the side pieces 3 of the frame 1; this step is not shown in the figures.

The machining step f) may comprise the milling of the external perimeter of the front piece 2 and subsequently the milling of the internal profile of the front piece 2 in order to house the lenses of the spectacles. Thereafter, the front piece 2 may undergo curving and tumble-finishing operations in order to remove the sharp edges and polish it and may be finished by means of transparent varnishing and/or by means of anodization/passivation of the layer of metallic material 6.

In the case where both the front piece 2 and the side pieces 3 of the frame 1 are formed by respective multi-layered elements 10, a first multi-layered semi-finished product 110 will be made for the front piece 2 and two second multi-layered semi-finished products 110 will be made for the side pieces 3, which will then undergo various machining operations depending on the end use. The multi-layered elements of the side pieces 3 finally are joined to the front piece 2 by means of the hinges 4, in a manner known per se for the person skilled in the art.

From the above description it is now clear how the multi-layered element, the spectacle frame and the method for manufacturing the multi-layered elements are advantageously able to achieve the predefined objects.

In particular, it is clear how the use of a multi-layered element of the type described above for manufacturing a spectacle frame is able to achieve varied and special aesthetic effects.

As a matter of fact the spectacle frame made in this way has the two visible surfaces formed by two different materials. Moreover, the method for manufacturing the multi-layered element is able to join together in stable manner the layer of polymeric material and the layer of metallic material.

Advantageously, the multi-layered element obtained as described above is particularly resistant to acids, low and high temperatures, solvents, alkalis, oils, moisture, salt fog, fats and atmospheric agents.

Obviously the above description of the embodiments applying the innovative principles of the present invention is provided only by way of example of these innovative principles and must therefore not be regarded as limiting the scope of the rights claimed herein. In particular, the characteristic features of the solutions shown here may be mixed and combined with each other according to specific needs and wishes, as may now be easily imagined by the person skilled in the art.

The invention claimed is:

1. A spectacle frame comprising:
a front piece;
a pair of side pieces joined to the ends of the front piece;
wherein said front piece and/or said side pieces are formed by multi-layered elements comprising at least one layer of polymeric material and at least one layer of metallic material joined together by means of a layer of adhesive material;
wherein said layer of metallic material is arranged on outer surfaces of said front piece and/or of said side pieces;
wherein said polymeric material is cellulose acetate; and
wherein the layer of adhesive material is placed between a joining surface of the layer of polymeric material and a joining surface of the layer of metallic material, said joining surfaces having superficial roughness values different from each other; and
wherein the layer of metallic material has a smaller thickness than the layer of polymeric material.

2. The spectacle frame according to claim 1, characterized in that the superficial roughness value of the joining surface of said at least one layer of polymeric material is between 1 and 3.4 μm.

3. The spectacle frame according to claim 1, characterized in that the superficial roughness value of the joining surface of said at least one layer of metallic material is between 0.8 and 3.2 μm.

4. The spectacle frame according to claim 1, characterized in that said metallic material is chosen from the group consisting of aluminum, stainless steel, brass, titanium, bronze and copper.

5. The spectacle frame according to claim 1, characterized in that the adhesive material is of an acrylic type, modified acrylic type, epoxy type or an acrylic-epoxy mixture and comprises a catalyst.

6. A method for manufacturing the spectacle frame of claim 1, which method comprises the following steps:
(a) cutting a sheet of polymeric material to obtain the layer of polymeric material having a predefined profile;
(b) cutting a sheet of metallic material to obtain the layer of metallic material having a predefined profile;
(c) applying the layer of adhesive material on the joining surface of said layer of polymeric material and/or on the joining surface of said layer of metallic material;
(d) positioning said layer of metallic material on the joining surface of said layer of polymeric material on which said layer of adhesive material has been previously applied or positioning said layer of polymeric material on the joining surface of said layer of metallic material on which said layer of adhesive material has been previously applied;
(e) pressing and gluing said layer of polymeric material and said layer of metallic material to produce a multi-layered semi-finished product; and
(f) machining said multi-layered semi-finished product to produce said spectacle frame.

7. The method according to claim 6, characterized in that, before said step (c), a step (g) is provided for sandblasting the joining surfaces of said layer of polymeric material and said layer of metallic material designed to come into contact with said layer of adhesive material.

8. The method according to claim 7, characterized in that after said step (g) a step (h) is provided for cleaning the joining surfaces of the layers of polymeric material and metallic material which have previously undergone sandblasting.

* * * * *